United States Patent [19]
Cameron

[11] 3,765,107
[45] Oct. 16, 1973

[54] EDUCATIONAL AND GAME DEVICE
[76] Inventor: Ronald E. Cameron, 210 Roma St., Redlands, Calif. 92373
[22] Filed: June 1, 1972
[21] Appl. No.: 258,842

[52] U.S. Cl. ................................. 35/35 H, 35/75
[51] Int. Cl. ........................................... G09b 1/28
[58] Field of Search ............... 35/75, 2, 35 R, 35 H, 35/31 E; 40/86 R

[56] References Cited
UNITED STATES PATENTS

| | | | |
|---|---|---|---|
| 1,525,342 | 2/1925 | Van Order | 35/75 X |
| 3,377,071 | 4/1968 | Treinis | 35/75 X |
| 1,224,742 | 5/1917 | Hillyer | 35/35 H X |
| 3,022,001 | 2/1962 | Larsen | 35/75 X |
| 3,003,271 | 10/1961 | Purling | 40/86 R |
| 2,413,592 | 12/1946 | Strother | 35/75 X |
| 1,285,038 | 11/1918 | Chance | 35/35 H X |

FOREIGN PATENTS OR APPLICATIONS

| | | | |
|---|---|---|---|
| 123,858 | 3/1919 | Great Britain | 35/35 H |
| 382,965 | 11/1932 | Great Britain | 35/75 |

*Primary Examiner*—Wm. H. Grieb
*Attorney*—Robert L. Parker et al.

[57] ABSTRACT

A word teaching device particularly useful in remedial reading programs for children is described. A plurality of elongated sticks are used, each having a column of numbers on one face and an associated column of word parts on the opposite face of each stick. The word parts may be letters, groups of letters or syllables. A few such sticks are arranged for longitudinal sliding motion in an up and down direction in a stick holder. Windows provided on opposite faces of the stick holder permit viewing of a row of numbers on one side and a row of word parts on the other side. The sticks are independently slid up and down by a child to a selected row of numbers. When the device is turned over the word formed of the row of word parts in the other window is read by the child.

4 Claims, 4 Drawing Figures

PATENTED OCT 16 1973  3,765,107
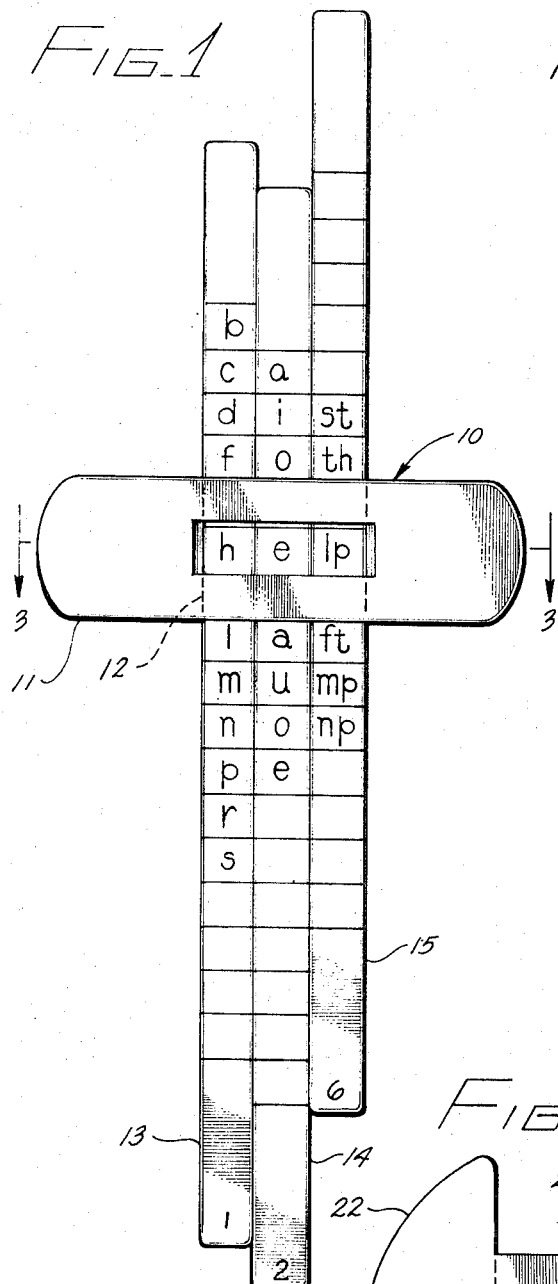
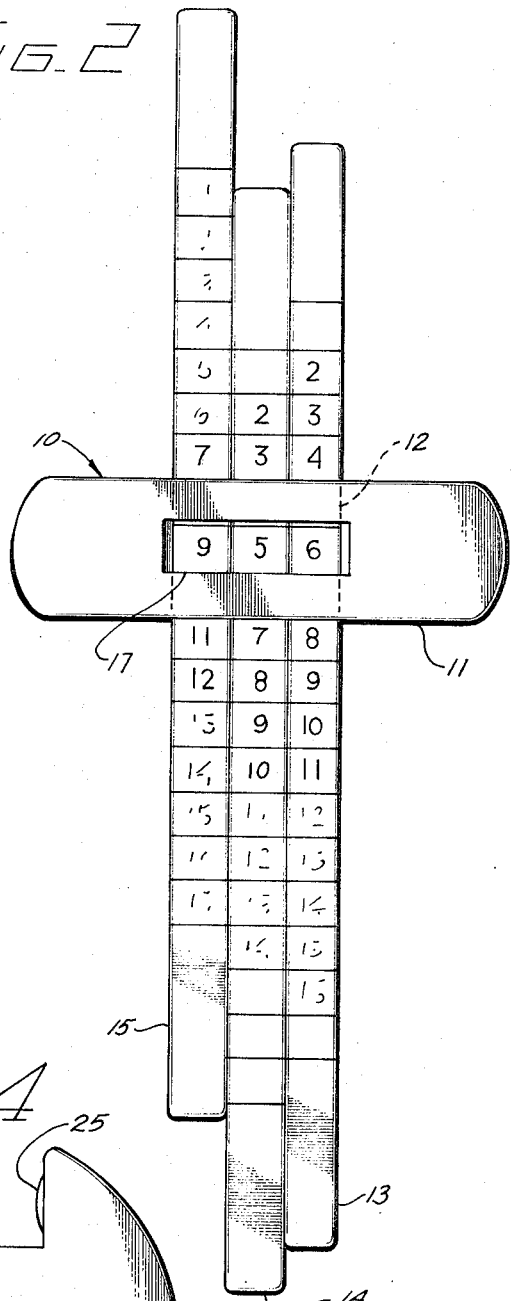
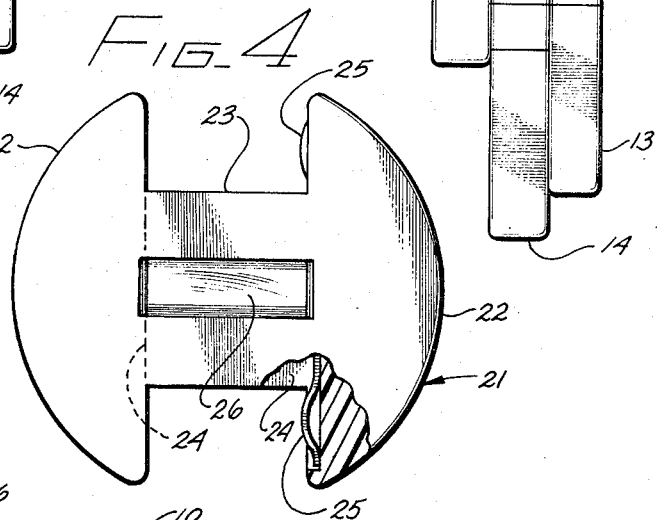
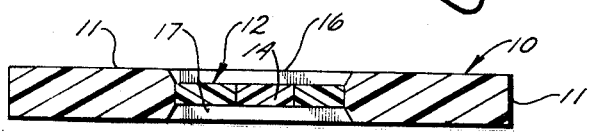

3,765,107

EDUCATIONAL AND GAME DEVICE

BACKGROUND OF THE INVENTION

One of the significant problems in modern education is the lack of reading ability in some children, many of whom may have reached advanced grades without having the basic reading ability to assimulate the subject matter they are encountering. Since reading is such a fundamental learning tool, a large number of remedial reading systems have been developed both in public education and in private enterprises. These remedial reading systems employ a variety of techniques for stimulating and maintaining the interest of the child in reading and learning.

One aspect of the inability to read is a failure to recognize many words and often a child will interpolate and guess what a word is from the context in which it appears, rather than learn the words sufficiently well that it can be recognized in another context. It is desirable to provide a remedial reading device by which individual words can be presented in an essentially random pattern for reading recognition. This can, of course, be accomplished with flash cards, or the like, but it is often difficult to maintain the child's interest in a regimen of flash cards.

It is highly desirable, therefore, to provide a device that the child itself can manipulate in order to generate the words to be read. Such a device should be inexpensive since remedial reading programs deal in very small groups and each child should have his own device to work with. By making the device interesting, the child may even generate his own words without instruction, thereby providing a degree of self-instruction. Since the device is to be used by children, its construction should be simple and rugged to withstand the abuse to which it will probably be subjected.

It sometimes occurs that a child who has reading problems requiring a remedial reading program also has dexterity problems which can be aided by carfully regulated activity. A mechanical device that the child manipulates by hand in the course of a reading program may also assist the child with a dexterity problem.

BRIEF SUMMARY OF THE INVENTION

There is, therefore, provided in the practice of this invention according to a presently preferred embodiment an educational or game device comprising a plurality of sticks having a column of numbers on one face of each stick and a column of word parts on the opposite face of each stick with each word part being associated with a number on the opposite face. There is a holder for a few of the sticks with a passage through the holder for mounting a few sticks for independent longitudinal slidable movement in an up and down direction. A pair of windows are provided on opposite sides of the holder so that a single row of the numbers appear in one window and the associated row of word parts appears in the window on the opposite side of the device.

DRAWINGS

These and other features and advantages of the invention will be appreciated as the same becomes better understood by reference to the following detailed description of a presently preferred embodiment when considered in connection with the accompanying drawings wherein:

FIG. 1 illustrates one side of an educational device constructed according to principles of this invention;

FIG. 2 illustrates the opposite side of the device of FIG. 1;

FIG. 3 is a transverse cross section through the device of FIG. 1; and

FIG. 4 illustrates another embodiment of a stick holder constructed according to principles of this invention.

DESCRIPTION

FIGS. 1 and 2 illustrate front and back views, respectively, of an educational or game device constructed according to principles of this invention. As illustrated in this presently preferred embodiment, there is a stick holder or view bridge 10 which is preferably formed of translucent or opaque plastic, or the like. This holder has a pair of wing portions 11, one at each side thereof so that it can be conveniently gripped by a child for manipulation. A flat passage 12 extends through the holder 10 in an up and down direction. It will be understood that, for purposes of exposition, up and down directions and left and right directions are employed with reference to the teaching device. In use the device may be oriented in any manner that suits the child using it. Alphanumeric indicia mentioned hereinafter are provided on the device and the designations up, down, left and right have meaning with respect to these indicia.

Three sticks, 13, 14 and 15 extend through the flat passage 12 and are elongated in an up and down direction. As seen best in FIG. 2, a column of numbers is provided on one face of each of the sticks, preferably beginning with the numeral "1" and increasing in regular order to a number in the range of about 15 to 20 at the lower end of the column. On the opposite face of each of the sticks is a column of word parts as best seen in FIG. 1. The word parts selected for the sticks are individual letters, groups of letters, such as vowel combinations or consonant blends, or entire syllables. Generally, the value of the educational device is greatest when the words are simple and individual letters and consonant blends are the most common combinations.

The sticks are preferably stiff straight members with a simple cross section and, hence, can be readily removed or inserted in the passage 12 so that the available combinations of word parts can be varied as desired to form new words. A total of little more than half a dozen sticks is sufficiently large set for providing substantially all desired combinations of word parts for constructing the simple words needed in the remedial reading program. A variety of word games can be played with the device and a larger and more varied selection of sticks may be useful for this purpose.

Preferably each of the sticks is numbered or otherwise identified so that upon instruction a child may select the appropriate sticks in his set and insert them into the passage through the holder. Thus, as illustrated in FIGS. 1 and 2, sticks 1, 2 and 6 have been selected and inserted in a holder sufficiently wide to accommodate three sticks. The holder and passage therethrough are sufficiently wide to accommodate a few sticks, typically only three or four, since this is sufficient for forming the principal words desired and also since a larger number of sticks becomes a more difficult problem for the child to handle. The simple words that can be formed are adequate for remedial reading purposes.

In the illustrated embodiment, three sticks are inserted in the holder. If it is desired to employ four or more sticks, the entire holder can be made somewhat wider to accommodate sticks of the same width and if it is desired to employ but three active sticks, a blank stick can be inserted into the passage along with three sticks having the alphanumeric indicia thereon. Another technique is to provide one set of sticks sufficiently wide that three sticks would substantially fill the passage through the holder and another set of sticks only three fourths as wide so that four sticks would be required to fill the passage. Generally, rather than unduly increase the number of sticks in the holder beyond four it is preferred to have larger word parts to make more complex words.

The view bridge 10 has an elongated window 16 through one face and transverse to the passage 12 so that when the sticks are inserted into it a row of word parts from the columns on the three sticks is visible through the window. In the simplest embodiment, the window 16 is merely a rectangular aperture having a length substantially the same as the width of the passage through the holder. On the opposite side of the holder is a second window 17 of similar form and preferably aligned with the first window, By aligning the windows the problems of manufacture are not only simplified, but also the decisions required of a child in inserting the sticks are minimized.

As seen in FIG. 2, a row of numbers is seen through window 17. Each number of each stick is associated in a one-for-one relation with a predetermined word part on the opposite face of the stick. For example, on the stick 13 the numberal "6" on one face of the stick is associated with the letter $h$ on the opposite face of the stick. Similarly, on the same stick 13, the number "9" corresponds to the letter $m$. Similarly, on the center stick 14, illustrated in the embodiments of FIGS. 1 and 2, the numeral "5" is directly associated with the letter $e$. It will also be noted that on this stick 14, the numeral "10" also is associated with the letter $e$, since it is found that a repetitive series of vowels on a single stick is particularly convenient for forming words with a minimum degree of sliding of the sticks. On the third stick 15, the numeral "9" on one side is associated with the consonant blend $1p$ on the opposite face.

When the educational device is used, an instructor tells the child to place sticks 1, 2 and 6 in the stick holder. When this is done, he would be instructed to put numbers "9, 5, 6" as a single row in the window 17 on one face of the holder. The child then turns the device over and sees the word "help" in the window 16. Since the word appears out of context, the child reads the word solely by means of phonics or whatever other word recognition techniques are employed in the particular remedial reading system with which the educational device is used.

The passage 12 in the holder is made sufficiently large that the sticks fit within it without substantial difficulty but is preferably made sufficiently close fitting that the sticks frictionally engage the holder with a sufficient force to prevent free longitudinal movement thereof solely under the influence of gravity so that when the child is holding only the holder, the sticks do not fall out. Frictional engagement of the sticks with the holder should, however, be sufficiently light that there is insufficient force to prevent free longitudinal movement of the sticks by a child moving them by hand. The proper frictional engagement can be obtained within the required manufacturing tolerances by appropriate selection of various plastic materials. A broad variety of coefficients of friction are available in plastic materials such as phenolic resins, fluorinated resins, acrylic resins, and the like, and any of a broad variety of materials and fabrication techniques can be employed, as will be apparent to one skilled in the art. It is particularly convenient to make the holder in the form of two or three layers bonded together by conventional adhesives with the windows in the outermost layers and the thickness of the passage defined by the spacing between the outermost layers. Preferably the sticks are formed of plastic having recessed or embedded numerals of contrasting color, rather than merely numerals printed on the surface so as to minimize wear during use of the device.

FIG. 4 illustrates another embodiment of a holder or view bridge 21 constructed according to principles of this invention. As illustrated in this embodiment, the sticks are deleted since they are substantially identical to those illustrated in FIGS. 1 and 2. The holder 21 has a pair of wings 22 at each side that collectively give the holder a substantially circular shape. A bridge 23 between the two wings 22 is of a lesser extent so that the overall holder has a generally "H" shape. A passage 24 passes through the body of the holder generally through the bridge 23 so that the sides of the passage coincide with the inner sides of the wings 22. This provides a somewhat longer support length for the sticks (not shown) passing through the passage to inhibit cocking thereof.

As seen in the cutaway portion of FIG. 4, one side of the passage in one of the wings 22 is slightly recessed to provide support for a flat spring 25 which serves to bias the sticks towards the opposite side of the holder. This assures a controlled frictional engagement of the sticks to prevent their falling out of the holder under gravity and providing a sufficiently small force that a child can manipulate the sticks freely.

A pair of opposed windows 26, one of which is seen in FIG. 4, are provided in opposite faces of the bridge 23. Each of the windows is provided with a cylindrical magnifier which enlarges an alphanumeric indicia appearing in that window for easier viewing by the child. This also permits the use of somewhat shorter sticks or a larger number of indicia on the same length stick as compared with the embodiment illustrated in FIGS. 1 and 2.

Although limited embodiments of educational and game device constructed according to the principles of this invention have been described and illustrated herein, many modifications and variations will be apparent to one skilled in the art. Thus, for a few examples, instead of using numbers on one side of the sticks, pictures can be used. It is preferable however to use numbers since the educational advantage of rapid number recognition and association is also achieved. As mentioned hereinabove, the windows on opposite sides of the device can be staggered if desired, however, there is no significant advantage and confusion can result if the sticks are improperly inserted into the holder. Similarly, the two wings on the device are preferably symmetrical so that they can be freely used by left-handed or right-handed children and be equally well manipulated from either side. If desired, however, it is apparent that a handle or the like can be provided on one side for a different mode of gripping.

Presumably the indicia on the sticks could be arranged in rows and viewed in columns in the windows. However, this is contrary to the usual mode of reading and offers no advantages. Similarly, the indicia on the sticks are reversed on one side as compared with the other and if desired they can be inverted instead. This however requires the child to turn the device over around its long direction and this is not as easy as turning it about the short direction provided in the preferred embodiment. The sticks in the preferred embodiment have a rectangular cross section which is significantly preferred for ready interchangeability of sticks and ease of manufacture. It will be apparent of course that a variety of tongue and groove and similar interlocking arrangements can be provided between adjacent sticks and between the sticks and holder if desired. Many other modifications and variations will be apparent to one skilled in the art and it is, therefore, understood that within the scope of the appended claims the invention may be practiced otherwise than specifically described.

What is claimed is:

1. An educational or game device comprising:
   a body having a transparent window on a front face and a corresponding transparent window on a back face, said windows being elongated in a left and right direction, and having a passage extending through the body in an up and down direction, each of the windows viewing a portion of the passage, said body including a wing portion on each side of the windows for hand gripping;
   a plurality of removable sticks elongated in an up and down direction and having a width such that a few of the sticks substantially fill the width of the passage through the body;
   said sticks being in side-by-side engagement and in frictional engagement with the body with a sufficient force to prevent free longitudinal movement due only to gravity and with an insufficient force to prevent longitudinal movement by hand by a child, said sticks having a sufficiently uniform transverse cross section to be removable from the passage from an end thereof;
   a plurality of letters and blends of letters arranged in a column on one face of the sticks; and
   a plurality of consecutive small numbers arranged in a column on the other face of the sticks, said letters and numbers bearing a one-to-one relation to each other so that a row of numbers appearing in one window corresponds to a predetermined row of letters in the other window, and wherein the letters are reversed relative to the numbers so that both read from left to right in the windows when the device is turned over about an axis extending in an up and down direction, the letters being in different sequences on different sticks.

2. A educational or game device as defined in claim 1 further comprising: spring means adjacent the passage for biasing the sticks towards one side thereof.

3. An educational or game device comprising:
   a plurality of elongated sticks each having a pair of opposed flat faces and substantially uniform transverse cross section throughout their length;
   a column of numbers on one face of each stick;
   a column of word parts on the opposite face of each stick, each word part being associated with a number on the opposite face of the stick and wherein the word parts are reversed relative to the numbers so that both read from left to right when the device is turned over about an axis extending in an up and down direction, the word parts being different on different sticks for forming words;
   a holder for a few of the sticks;
   a passage through the holder for mounting a few sticks in side-by-side engagement for independent longitudinal slidable movement in an up and down direction, said passage having a length considerably less than the length of the sticks so that the sticks can be manipulated from either end thereof;
   first and second windows through opposite sides of the holder for viewing a single row of the numbers in one window and an associated row of the word parts in the other window, said windows being opposite each other so that one can see through the holder when the sticks are removed, and each having a length substantially the same as the width of the passage means so that a row of adjacent word parts or a row of numbers appears in a single window; and
   wherein the sticks frictionally engage the holder with a sufficient force to prevent free longitudinal movement due only to gravity and with an insufficient force to prevent longitudinal movement by hand by a child.

4. An educational or game device as defined in Claim 3 further comprising: spring means adjacent the passage means for biasing the sticks towards one side thereof.

* * * * *